United States Patent
Heidenreich et al.

(10) Patent No.: US 6,874,610 B2
(45) Date of Patent: Apr. 5, 2005

(54) COMPACT DRY POWER TAKEOFF UNIT

(75) Inventors: David C. Heidenreich, Akron, OH (US); Robert E. Herchick, Copley, OH (US)

(73) Assignee: Power Transmission Technology, Inc., Sharon Center, OH (US)

( * ) Notice: Subject to any disclaimer, the term of this patent is extended or adjusted under 35 U.S.C. 154(b) by 0 days.

(21) Appl. No.: 10/400,827

(22) Filed: Mar. 27, 2003

(65) Prior Publication Data

US 2003/0183474 A1 Oct. 2, 2003

Related U.S. Application Data

(63) Continuation-in-part of application No. 09/887,601, filed on Jun. 22, 2001, now Pat. No. 6,557,687.

(51) Int. Cl.[7] .............................................. F16D 13/52
(52) U.S. Cl. ............. 192/110 B; 192/70.2; 192/85 AA; 192/112
(58) Field of Search ............................... 192/70.19, 70.2, 192/85 AA, 89.26, 110 B, 112, 115; 74/11, 15.63

(56) References Cited

U.S. PATENT DOCUMENTS

| | | | | |
|---|---|---|---|---|
| 4,574,926 A | * | 3/1986 | Bubak ....................... | 192/18 A |
| 4,720,929 A | * | 1/1988 | Umberson .................... | 37/91 |
| 4,937,957 A | * | 7/1990 | Umberson .................... | 37/97 |
| 5,322,148 A | * | 6/1994 | Fernandez ............... | 192/70.13 |
| 5,389,049 A | * | 2/1995 | Mabee ......................... | 477/4 |
| 5,400,862 A | * | 3/1995 | Behlke et al. ............. | 180/53.1 |
| 5,601,171 A | * | 2/1997 | Flotow .................... | 192/70.13 |
| 5,667,047 A | * | 9/1997 | Weiss et al. ............. | 192/55.61 |
| 6,305,515 B1 | * | 10/2001 | Heidenreich et al. ..... | 192/18 A |

* cited by examiner

*Primary Examiner*—Saul Rodriguez
(74) *Attorney, Agent, or Firm*—Renner, Kenner, Greive, Bobak, Taylor & Weber

(57) ABSTRACT

A compact dry power takeoff clutch unit is adapted for interconnection with a flywheel of an engine. A housing is adapted for attachment to the engine and has a plurality of interleaved friction and separator disks maintained therein. A drive ring is connected to the friction disks and to the flywheel for driving the friction disks by the engine. An output shaft is interconnected with the separator disks. A pair of anti-friction bearings are received by the housing and provide the sole support for the output shaft. A pressure plate is configured to be nestingly received by a cup-shaped flywheel in order to maintain certain standardized dimensional constraints. Actuation of the clutch is achieved by a rotary union interposed between the pair of support bearings. A quiescent position for the separator disks is achieved by the mounting of the separator disks between the head and spring of shoulder bolts secured to an output hub mounted upon the output shaft. Gland rings are interposed about the output shaft on either side of the rotary union to minimize leakage and the passage of pressurized actuating fluid to the bearings.

28 Claims, 4 Drawing Sheets

COMPACT DRY POWER TAKEOFF UNIT

CROSS REFERENCE TO RELATED APPLICATIONS

This is a continuation-in-part of patent application Ser. No. 09/887,601, filed Jun. 22, 2001, for "Clutch Assembly and Diagnostic System," now U.S. Pat. No. 6,557,687, incorporated fully herein by reference.

TECHNICAL FIELD

The invention herein resides in the art of power transmission devices and, more particularly, to couplers between a power source and power driven implement. More particularly, the invention relates to power takeoff units. Specifically, the invention relates to a fluid actuated power takeoff clutch assembly adapted to be driven by the flywheel of a engine.

BACKGROUND ART

The use of clutches of various types to couple power from a power source such as an engine to auxiliary pieces of equipment is commonly known. Presently, over center mechanical engine clutches are often used to couple the flywheel of an engine to an auxiliary piece of equipment. Such clutches suffer from a number of problems, including pilot bearing failures, excessive wear, frequent adjustment and maintenance, and operator abuse while attempting to achieve engagement when the clutch is coupling the engine with a high inertia load such as in crushers and hammer mills. In view of the state of the prior art, there is a need for a hydraulicly actuated dry multiple disk clutch to serve as a power takeoff unit between the engine and high inertia loads. There is a need in the art for such a power takeoff unit that may easily and effectively be engaged to connect high inertia loads.

It is, of course, most desirable to maintain a dry clutch assembly or power takeoff unit in a package or envelope consistent with SAE standards, such that the size of the hydraulic power takeoff unit is readily adapted for implementation in presently known systems. Moreover, the use of pilot bearings in clutch assemblies and power takeoff units is also known to be extremely problematic. Pilot bearings are generally given to a short life, which is often aggravated by the operational environment of the system, fretting corrosion and the difficulties incident to relubrication. Moreover, pilot bearings are known to result in excessive loads on engine bearings, thus shortening engine life. There is a need in the art for a compact dry power takeoff unit that can be packaged within the constraints of SAE standards, and which provide operational integrity without the implementation of pilot bearings.

Automated engagement controls require engine speed sensors. Since different engines have different numbers of teeth on the flywheel, it is desired to standardize the pulse count by using the drive ring teeth, thus standardizing the control.

The art is further devoid of a simple yet effective structure for precluding inadvertent unsafe rotation of the output shaft and undesired heating and wear within the clutch when the clutch is positioned on a slope or incline.

The art is also devoid of a simple dry clutch with hydraulic activation that incorporates a manifold to control pressure, flow, and actuation time with single drain and supply lines, such that the clutch may be used with any of a variety of power sources.

DISCLOSURE OF THE INVENTION

In light of the foregoing, it is a first aspect of the invention to provide a compact dry power takeoff clutch unit in which the input end of the clutch thereof is rigidly fixed and directly coupled to the engine flywheel, without the need for bearing support of the clutch input.

Still a further aspect of the invention is the provision of a compact dry power takeoff clutch unit in which the output shaft is fully supported by two or more antifriction bearings.

Another aspect of the invention is the provision of a compact dry power takeoff clutch unit in which gland ring seals and shaft seals are interposed between the shaft support bearings to effect a rotary union fluid inlet for clutch actuation.

An additional aspect of the invention is the provision of a dry power takeoff clutch unit having oil seals at the outside edges of the shaft support bearings, and wherein the actuation fluid lubricates such bearings.

Yet another aspect of the invention is the provision of a compact dry power takeoff clutch unit wherein the clutch piston or pressure plate is located at the flywheel end of the clutch and is recessed into the flywheel.

Still a further aspect of the invention is the provision of compact dry power takeoff clutch wherein the pressure plate and separator plate are retained by two or more pins located between the inner diameter of the friction disks and the outer diameter of the operative piston cavity.

A further aspect of the invention is the provision of a compact dry power takeoff unit wherein the separator plates of the clutch assembly are positively located in the disengaged position, to reduce drag and heat within the clutch and prevent inadvertent shaft rotation.

Yet a further aspect of the invention is to provide a compact dry power takeoff clutch unit that is reliable and durable in operation, and easy to construct, install and service.

Still another aspect of the invention is to provide a compact dry power takeoff clutch unit employing a speed sensor providing a consistent pulse count irrespective of engine manufacturer or model, thus standardizing control for engagement and operation of the clutch.

An additional aspect of the invention is to provide a compact dry power takeoff clutch unit having an integral manifold with a single pressure line and a single drain line in communication with a hydraulic source, the manifold including a pressure reducing valve and solenoid valve, and an optional orifice and accumulator.

The foregoing and other aspects of the invention which will become apparent as the detailed description proceeds are achieved by a power takeoff clutch unit for interconnection with the flywheel of an engine, comprising: a housing adapted for attachment to the engine; a friction disk received within said housing; a separator disk in juxtaposition with said friction disk for selective engagement therewith; a drive ring connected to said friction disk and adapted for interconnection with the flywheel; an output shaft interconnected with said separator disk; and a pair of antifriction bearings received by said housing and supporting said output shaft.

Other aspects of the invention which will become apparent herein are attained by a power unit, comprising: a flywheel of cup-shaped configuration received within a flywheel housing; a power takeoff clutch interconnected between said flywheel and said flywheel housing, said power takeoff clutch comprising: an output shaft; a pressure plate received upon one end of said output shaft and nestingly received by said flywheel; an output hub fixed upon said output shaft; alternatingly interleaved friction and separator disks received between said pressure plate and output hub to selectively effect rotation of said output shaft; a pair of antifriction bearings rotationally receiving said output shaft and providing the sole support thereof; and wherein said output shaft is characterized by a rotary union interposed between said pair of bearings.

DESCRIPTION OF THE DRAWINGS

For a complete understanding of the objects, techniques and structure of the invention reference should be made to the following detailed description and accompanying drawings wherein.

BEST MODE FOR CARRYING OUT THE INVENTION

Figure 1:
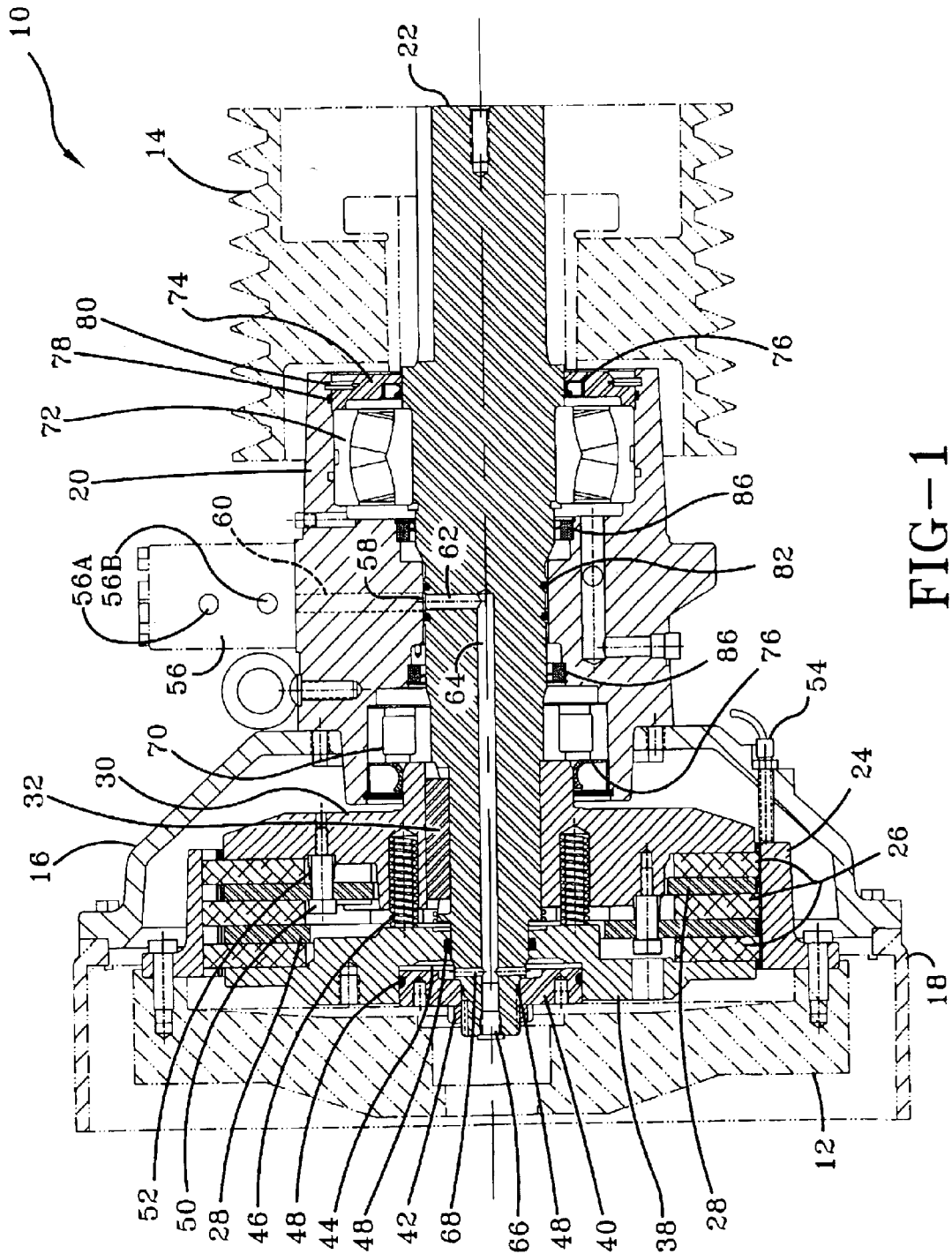
FIG. 1 is a cross sectional view of a compact dry power takeoff clutch unit according to the invention.

Referring now to the drawings and more particularly FIG. 1, it can be seen that a compact dry hydraulic power takeoff clutch unit made in accordance with the invention is designated generally by the numeral 10. The clutch unit 10 is adapted to be interposed between a power source which, in the preferred embodiment, is an engine flywheel 12, and an output coupler, such as the belt coupler 14, or the like. The clutch housing 16 is circumferentially bolted to the engine flywheel housing 18 at one end thereof and to an bearing housing 20 at the opposite end thereof. The clutch housing 16 and bearing housing 20 receive the output shaft 22 and the support structure therefor, as will become apparent later herein. The output shaft 22 has keyed thereto the output coupler 14.

A drive ring 24 is bolted to the flywheel 12 about the periphery thereof and splined to the outer circumferential surface of the friction disks 26. Interposed between the friction disks 26 are separator disks 28. While any number of friction disks and separator disks may be employed in keeping with the concept of the invention, in the preferred embodiment there are three friction disks 26 and two separator disks 28. It is, however, contemplated that a small clutch unit made in accordance with the invention may, for example, employ a single friction disk 26, with the pressure plate 38 serving as the sole separator disk.

Figure 2:
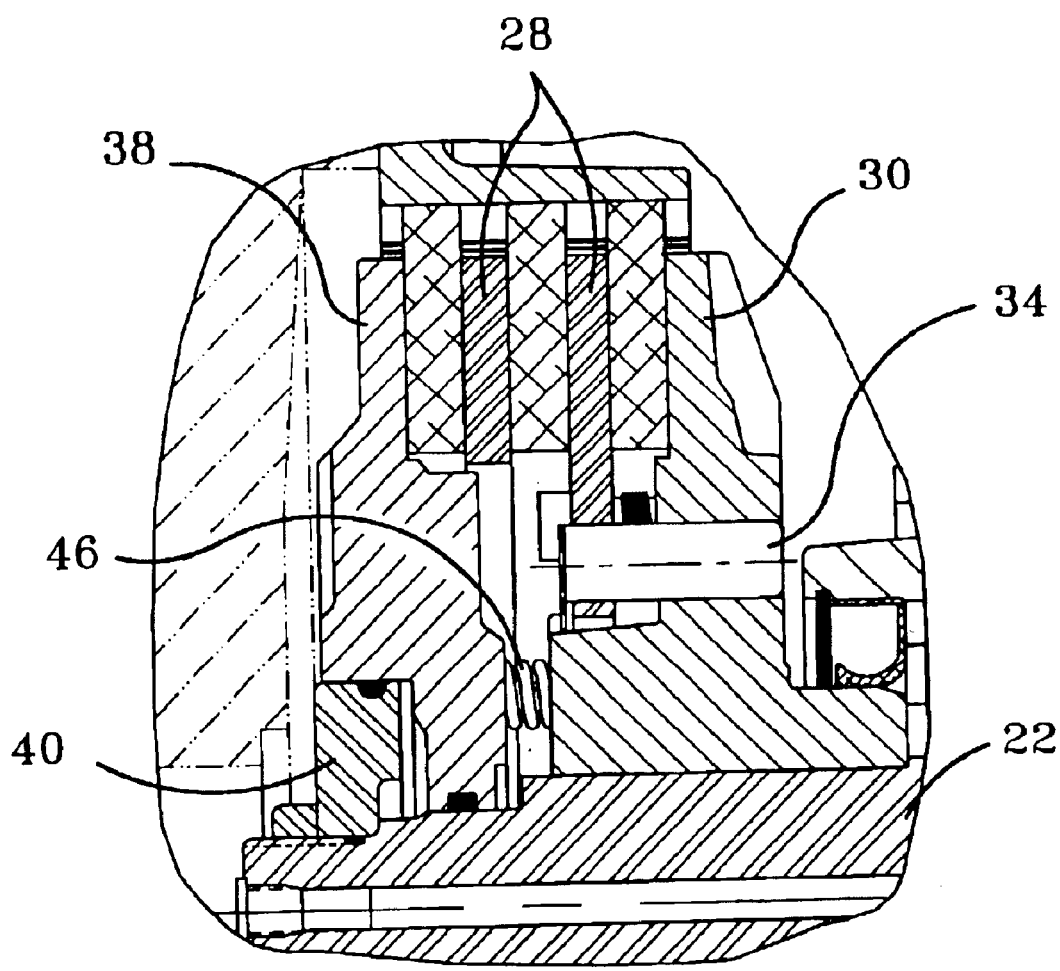
FIG. 2 is a partial cross sectional view of the clutch unit of FIG. 1, taken in a different plane.
Figure 3:
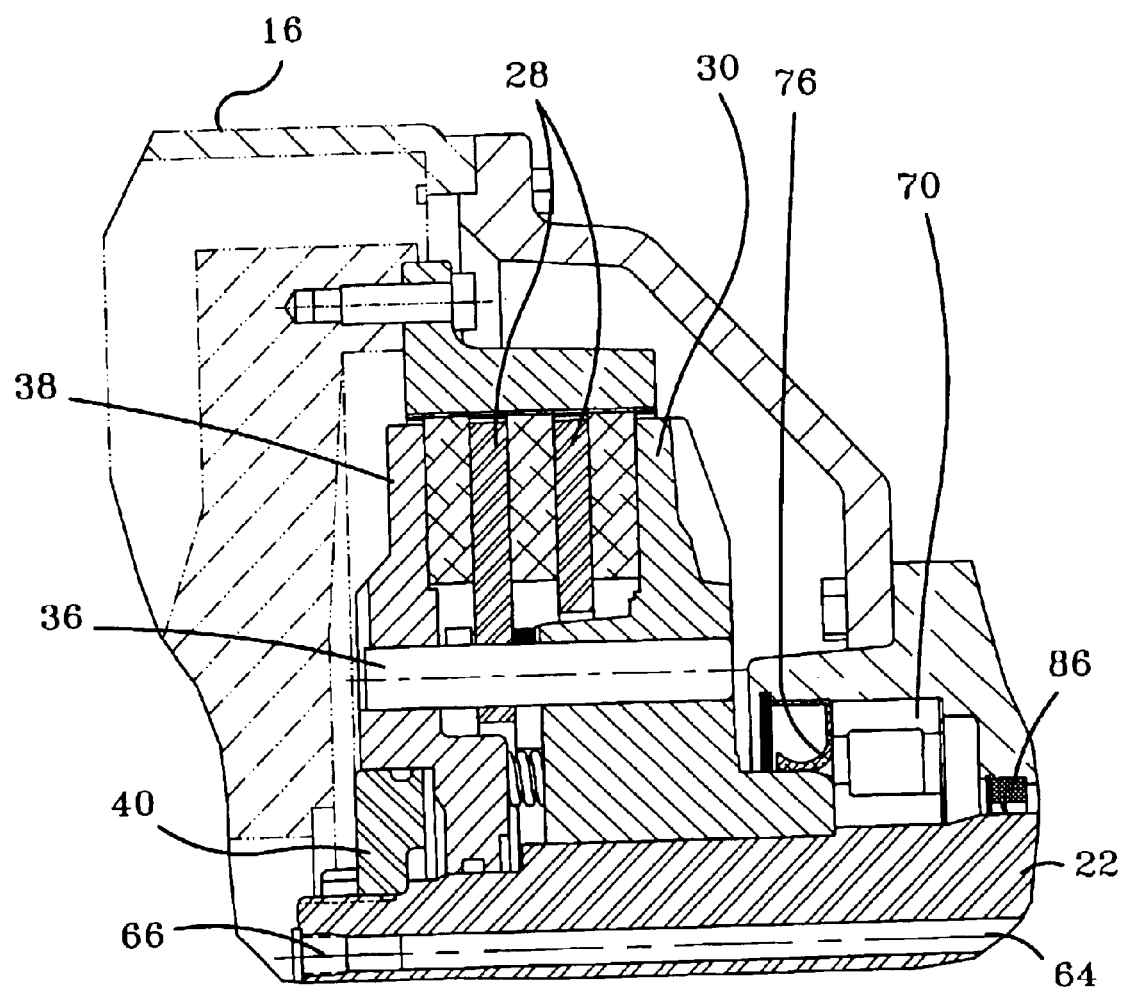
FIG. 3 is a partial cross sectional view of the clutch unit of FIGS. 1 and 2, taken in yet another plane.

An output hub 30 is secured to the output shaft 22 by a key 32. As shown in FIGS. 2 and 3, a dowel pin 34 passes through an aperture in the separator disk 28 most distal from the flywheel, rotationally securing such separator disk 28 to the output hub 30. Similarly, dowel pin 36 passes through an aperture in the separator disk 28 most proximal to the flywheel 12 and rotationally secures that separator disk 28 to the output hub 30. A pressure plate or piston 38 is similarly rotationally engaged with the output hub 30 by the dowel pin 36. It will be appreciated that at least two dowel pins 34 secure the associated separator disk to the output hub 30, while at least two dowel pins 36 similarly secure the piston or pressure plate 38 and associated separator disk 28 to the output hub 30. It will also be noted that the dowel pins 34, 36 are positioned between the inner diameter of the friction disks 28 and the outside diameter of the pressure cavity 44 minimize axial length of the clutch 10, thus providing space for support bearings and a rotary union structure.

As shown in FIGS. 1–3, a backplate 40 is secured to an end of the shaft 22 by means of a locknut 42. The backplate 40 is received in an annular recess within the pressure plate or piston 38 and defines therebetween a pressure cavity 44 for receipt of hydraulic fluid or other actuating fluid that is operative to axially move the piston 38 to engage the stack of friction and separator disks 26, 28 to drive the output shaft 22, as would be readily appreciated by those in the art.

Return springs 46 are interposed between the output hub 30 and piston 38 to return the piston 38 when hydraulic pressure is released, such that the friction disks 26 and separator disks 28 can thus disengage. Appropriate O-ring seals 48 are positioned between the various combinations of the shaft 22, piston 38, and backplate 40 as shown to preclude leakage or passage of the actuating hydraulic fluid.

In order to assure separation between the friction disks 26 and separator disks 28 when the clutch is disengaged, and to further reduce drag and heat and inadvertent rotation of the output shaft as by gravitational axial movement of the friction and separator disks when used on an incline or the like, positive spacers are employed with each of the separator disks 28. These spacers comprise a pair of shoulder bolts 50 associated with each of the separator disks 28 and passing through apertures therein. A spring 52 is maintained over each of the shoulder bolts 50 and is interposed between the output hub 30 and associated separator disk 28 to urge the separator disk 28 into contacting engagement with the head of the shoulder bolt 50 when the clutch is disengaged. The springs 52 assure desired separation among the disks 26, 28 and, dependent upon the force of the associated springs 52, serve to reduce inadvertent drag among the disks.

The drive ring 24, connected directly to the flywheel 12, provides a suitable means for determining the rotational speed of the power input source. To that end, an appropriate speed or rpm sensor 54 passes through the clutch housing 16 and into communication with the drive ring 24. It is similarly contemplated that the sensor 54 may pass into direct communication with the flywheel 12 for such purpose. In either case, the sensor 54 would monitor the input speed of the engine or power source. It is also contemplated that the sensor 54 might be mounted in the clutch housing 16 to monitor the output speed of the clutch assembly 10 by communicating with the output hub 30. The signals generated by the sensor 54 may be passed to an appropriate controller such as a dedicated microprocessor or the like for controlling the engagement and disengagement of the clutch 10 in a manner consistent with those presented in the parent co-pending patent application, the teachings of which are incorporated herein by reference.

An appropriate manifold 56, including a pressure reducing valve, solenoid valve, orifice, pressurized fluid source and accumulator, allows for regulated passage of the hydraulic or other control fluid through the stationary bearing housing 20, through the rotatable shaft 22 and to the pressure cavity 44. The manifold 56 communicates through an inlet 56A and an outlet 56B with the hydraulic system of the engine or machine associated with the flywheel 12, and allows for the implementation of the power takeoff clutch unit 10 with a broad range of hydraulic systems. The accumulator is positioned downstream of the orifice to control the rate of pressure buildup from the orifice, allowing for consistent "bumping" during the clutch engagement process irrespective of actuating fluid temperature or viscosity.

A circumferential groove 58 is provided about the shaft 22 to communicate through a bore 60 in the fixed bearing housing 20 to the pressure source of the manifold 56. Accordingly, pressurized fluid is passed through the bore 60, into the circumferential groove 58, and thence into the radial bore 62 provided in the shaft 22, which is in further communication with the axial bore 64. A cap 66 is provided at the end of the bore 64, as shown. A diametric bore 68 intersects the bore 64 and communicates on either side thereof with the pressure cavity 44. Accordingly, actuation of the clutch may be achieved through the rotary union assembly 58–62, through the axial bore 64, diametric bore 68, and into the pressure cavity 44.

An important feature of the instant invention is the provision of bearings on opposite sides of the rotary union interface. In this regard, a cylindrical bearing 70 is provided on the side of the rotary union interface proximal the power input, while a spherical bearing 72 is provided on the side of the rotary union interface proximal the power output. The antifriction bearings 70, 72 fully support the shaft 22 and, in the preferred embodiment of the invention, are the only bearings required for such support.

The combination of the housing 16, and bearing housing 20 is sealed at the output end by the seal cover 74, secured by the retaining ring 80. Appropriate shaft seals 76, 86 are provided on opposite sides of each of the bearings 70, 72, as shown. Finally, a seal 78 is interposed between the seal cover 74 and the output hub 30. Accordingly, the clutch assembly is effectively sealed from the power input of the flywheel 12 to the belt coupler 14 keyed to the end of the output shaft 22. Appropriate seals about the anti friction support bearings 70, 72 provide for maintenance of the integrity of those bearing during operation. It is contemplated that the inner seals 86, on the inner edges of the bearings 70, 72 and on opposite sides of the rotary union 58–62 may be eliminated, with the necessary desired sealing being effected by the pair of seals 76 along the outer edges of the bearings 70, 72, as shown. In such a structure, the actuation fluid may serve as the lubricating fluid for the bearings. Accordingly, where the bearings 70, 72 are to be grease lubricated, both seals 78, 86 are employed. However, where the bearings 70, 72 are to be lubricated with the actuating fluid, only the outboard seals 76 need be employed.

Figure 4:
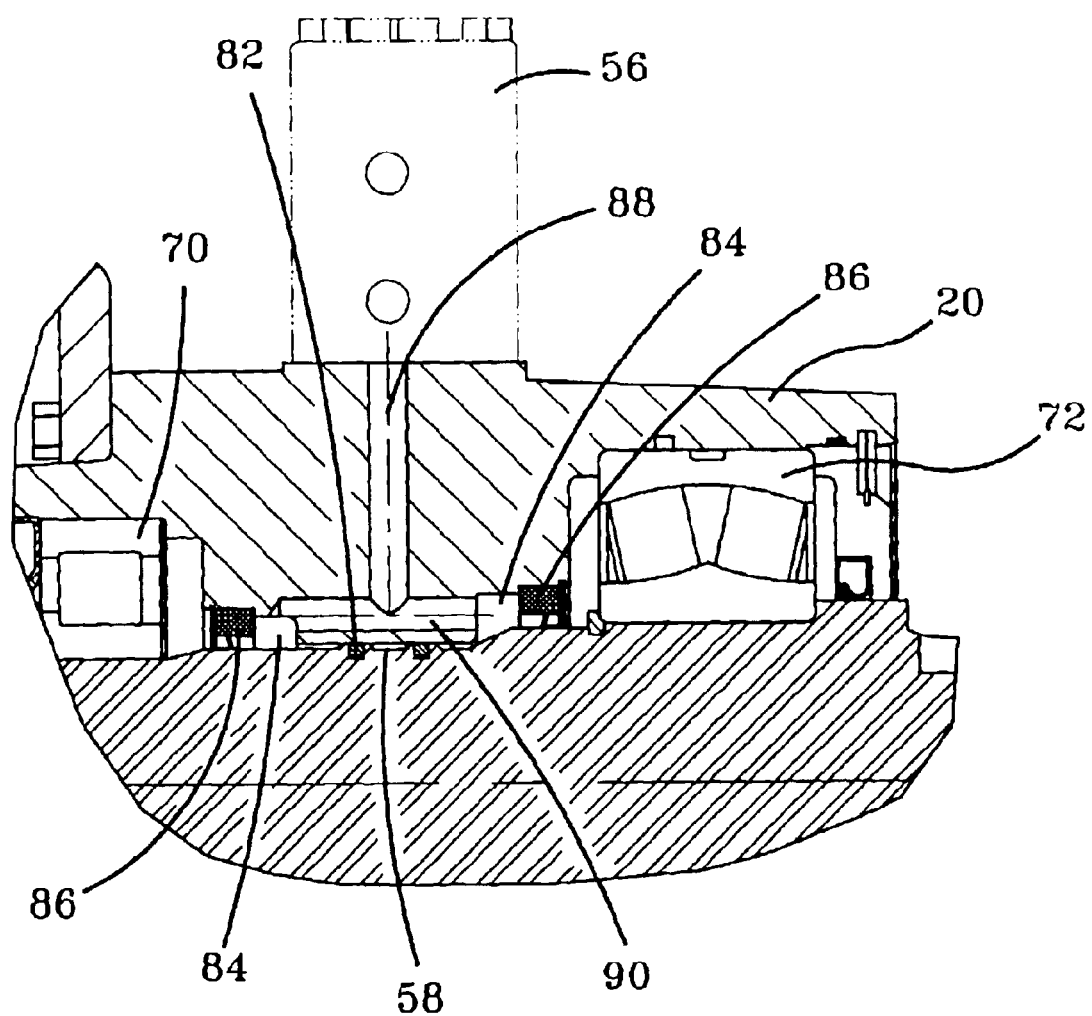
FIG. 4 is a partial cross sectional view of the clutch of FIGS. 1–3, taken in still another plane.

In order to minimize the pressure of hydraulic fluid upon the shaft seals 76, 86, appropriate glands rings 82 are provided on each side of the circumferential groove 58. As shown in FIG. 4, actuating fluid from the circumferential groove 58 that may pass by the gland rings 82 are received in the cavities 84 adjacent the inner seals 86, if employed. An axial bore 90 interconnects the two cavities 84 and, through the drain 88, provides a return path to the manifold 56 and thence to the associated hydraulic system.

The compact nature of the dry power takeoff clutch unit 10 is achieved, in substantial part by the use of the pair of bearings 70, 72 on opposite sides of the rotary union assembly 58–62 and by nesting the end of the shaft 22, piston 38 and backplate 40 within the cavity of the cup-shaped flywheel 12, as shown in FIG. 1. This preferred structure allows mating with a flywheel 12 that conforms to SAEJ620, which is received within an engine flywheel housing that conforms to SAEJ617C, with the axial length of the dry power takeoff clutch unit 10 conforming to SAE J621D.

Thus it can be seen that the objects of the invention have been satisfied by the structure presented above. While in accordance with the patent statutes only the best mode and preferred embodiment of the invention has been presented and described in detail, the invention is not limited thereto by thereby. Accordingly, for an appreciation of the true scope and breadth of the invention reference should be made to the following claims.

What is claimed is:

1. A fluid actuated power takeoff clutch unit for interconnection with the flywheel of an engine, comprising:
   a housing adapted for attachment to the engine;
   a friction disk received within said housing;
   a separator disk in juxtaposition with said friction disk for selective engagement therewith;
   a drive ring connected to said friction disk and adapted for interconnection with the flywheel;
   an output shaft interconnected with said separator disk; and
   a pair of antifriction bearings received by said housing and supporting said output shaft; and
   a pair of gland ring seals about said shaft and interposed between said pair of antifriction bearings.

2. The power takeoff clutch unit according to claim 1, wherein said shaft is characterized by a circumferential groove of a rotary union interposed between said gland rings.

3. The power takeoff clutch unit according to claim 2, further comprising a first pair of shaft seals, one on each of the most distal sides of the antifriction bearing from each other.

4. The power takeoff clutch unit according to claim 3, further comprising a pair of collection cavities within said housing interposed between said antifriction bearings and on opposite sides of said pair of gland rings.

5. The power takeoff clutch unit according to claim 4, wherein said housing further comprises a drain in interconnecting communication with said pair of cavities, said drain being operative to return fluid from said cavities.

6. The power takeoff clutch unit according to claim 5, further comprising a second pair of shaft seals, one on each of the most proximal sides of the antifriction bearings to each other.

7. The power takeoff clutch unit according to claim 1, further comprising a pressure plate received by an end of said output shaft, said pressure plate being configured for receipt within the flywheel.

8. The power takeoff clutch unit according to claim 7, further comprising an output hub secured to said output shaft, said pressure plate and separator disk being rotationally secured to said output hub.

9. The power takeoff clutch unit according to claim 8, wherein said pressure plate is in communication with an annular pressure cavity, and wherein said pressure plate, separator disk and output hub are secured by pins extending thereamong, said pins being maintained between an outside diameter of said pressure cavity, and an inside diameter of said friction disk.

10. The power takeoff clutch unit according to claim 1, further comprising an output hub secured to said output shaft, and a bolt positionally securing said separator disk to said output hub.

11. The power takeoff clutch unit according to claim 10, wherein said bolt is a shoulder bolt slidingly securing said separator disk between a head of said shoulder bolt and a spring received thereon, said spring biasing said separator disk toward said head.

12. The power takeoff clutch unit according to claim 1, further comprising a speed sensor received by said housing and in communication with said drive ring, said speed sensor producing an output signal corresponding to the rotational speed of the engine by taking pulses off of said drive ring.

13. The power takeoff clutch unit according to claim 12, further comprising a manifold upon said housing, said manifold communicating with a rotary union and having a pressure regulating valve and a solenoid actuated valve.

14. The power takeoff clutch unit according to claim 13, wherein said manifold further comprises an orifice controlling a flow rate of the actuating fluid.

15. The power takeoff clutch unit according to claim 14, wherein said manifold further comprises an accumulator controlling a rate of pressure build up of said actuating fluid.

16. A power unit, comprising:
   a flywheel of cup-shaped configuration, received within a flywheel housing;
   a power takeoff clutch interconnected between said flywheel and said flywheel housing, said power takeoff clutch comprising:
   an output shaft;
   a pressure plate received upon one end of said output shaft and nestingly received by said flywheel;
   an output hub fixed upon said output shaft;
   alternatingly interleaved friction and separator disks received between said pressure plate and output hub to selectively effect rotation of said output shaft;
   a pair of antifriction bearings rotationally receiving said output shaft and providing the sole support thereof; and
   wherein said output shaft is characterized by a rotary union interposed between said pair of bearings, and said separator disks are positively positioned and maintained in an axial position, when the power takeoff clutch is not actuated, by shoulder bolts secured to said output hub and having an associated separator disk maintained between a head and spring thereon.

17. The power unit according to claim 16, further comprising first seals about distal edges of said pair of bearings.

18. The power unit according to claim 17, further comprising second seals about said output shaft at proximal edges of said pair of bearings, and a drain associated with said rotary union communicating with said second seals.

19. The power unit according to claim 18, wherein one of said bearings is a spherical bearing.

20. A power takeoff clutch unit for interconnection with the flywheel of an engine, comprising:
   a housing adapted for attachment to the engine;
   a friction disk received within said housing;
   a separator disk in juxtaposition with said friction disk for selective engagement therewith;
   a drive ring connected to said friction disk and adapted for interconnection with the flywheel;
   an output shaft interconnected with said separator disk;
   a pair of antifriction bearings received by said housing and supporting said output shaft;
   a pair of gland ring seals about said shaft and interposed between said pair of antifriction bearings, said shaft being characterized by a circumferential groove of a rotary union interposed between said gland rings;
   a first pair of shaft seals, one on each of the most distal sides of the antifriction bearing from each other; and
   a pair of collection cavities within said housing interposed between said antifriction bearings and on opposite sides of said pair of gland rings.

21. The power takeoff clutch unit according to claim 20, wherein said housing further comprises a drain in interconnecting communication with said pair of cavities, said drain being operative to return fluid from said cavities.

22. The power takeoff clutch unit according to claim 21, further comprising a second pair of shaft seals, one on each of the most proximal sides of the antifriction bearings to each other.

23. A power takeoff clutch unit for interconnection with the flywheel of an engine, comprising:
   a housing adapted for attachment to the engine;
   a friction disk received within said housing;
   a separator disk in juxtaposition with said friction disk for selective engagement therewith;
   a drive ring connected to said friction disk and adapted for interconnection with the flywheel;
   an output shaft interconnected with said separator disk;
   a pair of antifriction bearings received by said housing and supporting said output shaft;
   a pressure plate received by an end of said output shaft, said pressure plate being configured for receipt within the flywheel;
   an output hub secured to said output shaft, said pressure plate and separator disk being rotationally secured to said output hub; and
   wherein said pressure plate is in communication with an annular pressure cavity, and wherein said pressure plate, separator disk and output hub are secured by pins extending thereamong, said pins being maintained between an outside diameter of said pressure cavity, and an inside diameter of said friction disk.

24. A power takeoff clutch unit for interconnection with the flywheel of an engine, comprising:
   a housing adapted for attachment to the engine;
   a friction disk received within said housing;
   a separator disk in juxtaposition with said friction disk for selective engagement therewith;
   a drive ring connected to said friction disk and adapted for interconnection with the flywheel;
   an output shaft interconnected with said separator disk;
   a pair of antifriction bearings received by said housing and supporting said output shaft;
   a speed sensor received by said housing and in communication with said drive ring, said speed sensor producing an output signal corresponding to the rotational speed of the engine by taking pulses off of said drive ring; and
   a manifold upon said housing, said manifold communicating with a rotary union and having a pressure regulating valve and a solenoid actuated valve.

25. The power takeoff clutch unit according to claim 24, wherein said manifold further comprises an orifice controlling a flow rate of the actuating fluid.

26. The power takeoff clutch unit according to claim 25, wherein said manifold further comprises an accumulator controlling a rate of pressure build up of said actuating fluid.

27. A power unit, comprising:
   a flywheel of cup-shaped configuration, received within a flywheel housing;
   a power takeoff clutch interconnected between said flywheel and said flywheel housing, said power takeoff clutch comprising:
   an output shaft;
   a pressure plate received upon one end of said output shaft and nestingly received by said flywheel;

an output hub fixed upon said output shaft;

alternatingly interleaved friction and separator disks received between said pressure plate and output hub to selectively effect rotation of said output shaft;

a pair of antifriction bearings rotationally receiving said output shaft and providing the sole support thereof; and wherein said output shaft is characterized by a rotary union interposed between said pair of bearings, and further comprising first seals about distal edges of said pair of bearings and second seals about said output shaft at proximal edges of said pair of bearings, and a drain associated with said rotary union communicating with said second seals.

28. The power unit according to claim 27, wherein said separator disks are positively positioned and maintained in an axial position, when the power takeoff clutch is not actuated, by shoulder bolts secured to said output hub and having an associated separator disk maintained between a head and spring thereon.

* * * * *